US011687719B2

(12) United States Patent
Schäfer et al.

(10) Patent No.: US 11,687,719 B2
(45) Date of Patent: *Jun. 27, 2023

(54) POST-FILTERING OF NAMED ENTITIES WITH MACHINE LEARNING

(71) Applicant: LEVERTON HOLDING LLC, Solon, OH (US)

(72) Inventors: Christian Schäfer, Berlin (DE); Michael Kieweg, Berlin (DE); Florian Kuhlmann, Berlin (DE)

(73) Assignee: LEVERTON HOLDING LLC, Solon, OH (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/188,362

(22) Filed: Mar. 1, 2021

(65) Prior Publication Data

US 2021/0182494 A1 Jun. 17, 2021

Related U.S. Application Data

(63) Continuation of application No. 16/416,827, filed on May 20, 2019, now Pat. No. 10,936,820.
(Continued)

(51) Int. Cl.
*G06F 40/295* (2020.01)
*G06N 3/08* (2023.01)
(Continued)

(52) U.S. Cl.
CPC .......... *G06F 40/295* (2020.01); *G06F 17/16* (2013.01); *G06F 18/2185* (2023.01); *G06F 18/295* (2023.01); *G06N 3/08* (2013.01);

*G06V 10/82* (2022.01); *G06V 30/19173* (2022.01); *G06V 30/10* (2022.01)

(58) Field of Classification Search
CPC ..... G06F 40/295; G06F 17/16; G06K 9/6264; G06K 9/6297; G06K 9/78; G06N 3/08
See application file for complete search history.

(56) References Cited

U.S. PATENT DOCUMENTS

| 7,689,408 B2 * | 3/2010 | Chen ...................... G06F 40/295 |
| | | 704/277 |
| 3,000,956 A1 | 8/2011 | Brun et al. |

(Continued)

FOREIGN PATENT DOCUMENTS

EP 3314461 5/2018

OTHER PUBLICATIONS

International Search Report and Written Opinion dated Oct. 31, 2019 issued for International PCT Application No. PCT/IB2019/000602 filed May 29, 2019.
(Continued)

*Primary Examiner* — Utpal D Shah
(74) *Attorney, Agent, or Firm* — K&L Gates LLP (57) ABSTRACT

A method for identifying errors associated with named entity recognition includes recognizing a candidate named entity within a text and extracting a chunk from the text containing the candidate named entity. The method further includes creating a feature vector associated with the chunk and analyzing the feature vector for an indication of an error associated with the candidate named entity. The method also includes correcting the error associated with the candidate named entity.

20 Claims, 5 Drawing Sheets

Related U.S. Application Data (60) Provisional application No. 62/674,312, filed on May 21, 2018.

(51) Int. Cl.

| | | |
|---|---|---|
| *G06F 18/20* | (2023.01) | |
| *G06F 18/21* | (2023.01) | |
| *G06V 30/10* | (2022.01) | |
| *G06F 17/16* | (2006.01) | |
| *G06V 30/19* | (2022.01) | |
| *G06V 10/82* | (2022.01) | |

(56) References Cited

U.S. PATENT DOCUMENTS

| | | | | |
|---|---|---|---|---|
| 8,000,956 | B2 * | 8/2011 | Brun | G06F 40/295 |
| | | | | 382/229 |
| 10,198,491 | B1 * | 2/2019 | Semturs | G06F 16/367 |
| 2007/0143284 | A1 * | 6/2007 | Lee | G06F 40/44 |
| | | | | 707/999.005 |
| 2007/0179776 | A1 * | 8/2007 | Segond | G06F 40/211 |
| | | | | 707/E17.062 |
| 2008/0052262 | A1 * | 2/2008 | Kosinov | G06F 16/50 |
| | | | | 707/E17.14 |
| 2009/0204596 | A1 | 8/2009 | Brun et al. | |
| 2017/0161367 | A1 * | 6/2017 | Kemp | G06F 16/685 |
| 2020/0081980 | A1 * | 3/2020 | Eisenberg | G06F 40/30 |

OTHER PUBLICATIONS

Chau et al., "Extracting meaningful entities from police narrative reports", Digital Government Research, Digital Government Society of North America, May 19, 2002, pp. 1-5.

* cited by examiner

[ ... ] This document is a lease between John Doe and Max Mustermann, referred to as LANDLORD and TENANT. [ ... ]

[ ... ] The landlord's contact, Jim Cane, is available in case of emergency. [ ... ]

Fig. 4A

[ ... ] This document is a lease between John Doe (L) and Max Mustermann (T), referred to as LANDLORD and TENANT. [ ... ]

[ ... ] The landlord's contact, Jim Cane (L), is available in case of emergency. [ ... ]

Fig. 4B

This document is a lease between John Doe (L) and Max Mustermann (T), referred to as LANDLORD and TENANT.

The landlord's contact, Jim Cane (L), is available in case of emergency.

Fig. 4C

| Candidate Named Entity | Label | Distance to Previous Chunk |
|---|---|---|
| John Doe | L | n/a |
| Max Mustermann | T | 5 characters |
| Jim Cane | L | 5,000 characters |

Fig. 4D

This document is a lease between John Doe (L) and Max Mustermann (T), referred to as LANDLORD and TENANT.

POST-FILTERING OF NAMED ENTITIES WITH MACHINE LEARNING

CROSS-REFERENCE TO RELATED APPLICATIONS

The present application is a continuation application of U.S. patent application Ser. No. 16/416,827 filed on May 20, 2019, which claims the benefit of U.S. Provisional Patent Application No. 62/674,312, filed May 21, 2018. The entire content of said applications are hereby incorporated by reference in their entireties.

BACKGROUND

When processing and reviewing documents on an electronic device, the documents may be scanned into document images or stored as a text. Where necessary, the text contained in document images may be recognized by an optical character recognition (OCR) system. Recognizing the text of the document image may enable the computing system to perform further analysis. For example, some types of documents contain named entities that are important to understanding the document. After recognizing the text, some document processing systems also attempt to identify named entities contained within the text of the document.

SUMMARY

The present disclosure presents new and innovative systems and methods for identifying errors associated with named entity recognition in a text. The following are example embodiments of such systems and methods. Although discussed individually, it should be understood that each of the below example embodiments may be combined with one or more additional example embodiments, and each such combined embodiment is herewith also disclosed.

In an example, a computer-implemented method is provided comprising recognizing a candidate named entity within a text, extracting a chunk from the text, wherein the chunk contains the candidate named entity, and creating a feature vector including a feature of the chunk. In some examples, the method may further comprise analyzing the feature vector with a classifier to identify an error associated with the candidate named entity and correcting the error associated with the candidate named entity. In another example, the method may further comprise storing a document image in a memory and recognizing the text from the document image. In a further example, the text is recognized from the document image by performing optical character recognition on the document image. In a still further example, the error associated with the candidate named entity is that the candidate named entity is not a named entity and correcting the error associated with the candidate named entity includes removing the candidate named entity as a potential named entity in the text. In another example, the classifier analyzes the feature vector using a first machine learning model. In a further example, the first machine learning model includes one or more of a recurrent neural network, a convolutional neural network, a conditional random field model, and a Markov model. In a still further example, the method further comprises receiving a labeled training chunk comprising (i) a candidate training named entity, (ii) a training chunk associated with the candidate training named entity, and (iii) a labeling output indicating whether the candidate training named entity is a named entity. In another example, the method further comprises creating a training feature vector, wherein the training feature vector includes a feature of the training chunk, analyzing the training feature vector using the first machine learning model to create a machine learning training output comprising an indication of whether the first machine learning model identified an error associated with the candidate training named entity, comparing the machine learning training output with the labeling output to create a training output comparison that identifies one or more errors in the training output, and updating one or more parameters of the first machine learning model based on the training output comparison. In a further example, the classifier is initially configured to identify errors associated with candidate named entities recognized from a first document type and updating one or more parameters of the first machine learning model enables the classifier to identify errors associated with candidate named entities recognized from a second document type. In a still further example, the candidate named entity is recognized using a second machine learning model. In another example, the feature vector includes one or more of a named entity label associated with the candidate named entity, a recognition accuracy prediction of the candidate named entity, a distance measure between the chunk and a previous chunk and/or a subsequent chunk, an embedding vector associated with the chunk, semantics of the chunk, and a similarity of the candidate named entity contained within the chunk and a named entity and/or a candidate named entity contained within a previously-identified chunk. In a further example, removing the candidate named entity improves the accuracy of named entities recognized within the text. In a still further example, the steps of the method are performed on a plurality of candidate named entities recognized within the text.

In an example, a system is provided comprising a classifier, a processor, and a memory. The memory contains instructions that, when executed by the processor, cause the processor to receive a chunk from a text, wherein the chunk contains a candidate named entity recognized within the text, create a feature vector including a feature of the chunk, analyze the feature vector with the classifier to identify an error associated with the candidate named entity, and correct the error associated with the candidate named entity. In another example, the error associated with the candidate named entity is that the candidate named entity is not a named entity and correcting the error associated with the candidate named entity includes removing the candidate named entity as a potential named entity in the text. In a further example, the classifier analyzes the feature vector using a first machine learning model. In a still further example, the classifier includes one or more of a recurrent neural network, a convolutional neural network, a conditional random field model, and a Markov model. In another example, the memory contains further instructions that, when executed by the processor, cause the processor to receive a labeled training chunk comprising (i) a candidate training named entity, (ii) a training chunk associated with the candidate training named entity, and (iii) a labeling output indicating whether the candidate training named entity is a named entity, create a training feature vector, wherein the training feature vector includes a feature of the training chunk, and analyze the training feature vector using the first machine learning model to create a machine learning training output comprising an indication of whether the first machine learning model identified an error associated with the candidate training named entity. The memory may contain further instructions that, when executed by the processor, cause the processor to compare the machine learning training output with the labeling output to create a training output comparison that identifies one or more errors in the training output and update one or more parameters of the first machine learning model based on the training output comparison. In a further example, the classifier is initially configured to identify errors associated with candidate named entities recognized from a first document type and updating one or more parameters of the first machine learning model enables the classifier to identify errors associated with candidate named entities recognized from a second document type. In a still further example, the system further comprises an initial processing system configured to receive a document image, perform OCR on the document image to recognize a text of the document image and create an OCR document, and recognize a candidate named entity within the text. In another example, the initial processing system further comprises a chunk extractor configured to extract the chunk from the text. In a further example, the initial processing system includes a second machine learning model configured to recognize the candidate named entity within the text. In a still further example, the feature vector includes one or more of a named entity label associated with the candidate named entity, a recognition accuracy prediction of the candidate named entity, a distance measure between the chunk and a previous chunk and/or a subsequent chunk, an embedding vector associated with the chunk, semantics of the chunk, and a similarity of the candidate named entity contained within the chunk and a named entity and/or a candidate named entity contained within a previously-identified chunk. In a further example, the system is configured to receive and process a plurality of chunks, each containing a candidate named entity recognized within the text.

In another example, a computer readable medium is provided, storing instructions which, when executed by one or more processors, cause the one or more processors to recognize a candidate named entity within a text, extract a chunk from the text, wherein the chunk contains the candidate named entity, create a feature vector including a feature of the chunk, analyze the feature vector with a classifier to identify an error associated with the candidate named entity, and correct the error associated with the candidate named entity. In a further example, the computer readable medium stores further instructions which, when executed by the one or more processors, cause the one or more processors to store a document image in a memory and recognize the text from the document image. In a still further example, the computer readable medium stores further instructions which, when executed by the one or more processors, cause the one or more processors to recognize the text from the document by performing optical character recognition (OCR) on the document image. In another example, the error associated with the candidate named entity is that the candidate named entity is not a named entity and correcting the error associated with the candidate named entity includes removing the candidate named entity as a potential named entity in the text. In a further example, the computer readable medium stores further instructions which, when executed by the one or more processors, cause the one or more processors to analyze the feature vector with the classifier using a first machine learning model. In a still further example, the first machine learning model includes one or more of a recurrent neural network, a convolutional neural network, a conditional random field model, and a Markov model. In another example, the computer readable medium stores further instructions which, when executed by the one or more processors, cause the one or more processors to receive a labeled training chunk comprising (i) a candidate training named entity, (ii) a training chunk associated with the candidate training named entity, and (iii) a labeling output indicating whether the candidate training named entity is a named entity and create a training feature vector, wherein the training feature vector includes a feature of the training chunk. In a further example, the computer readable medium stores further instructions which, when executed by the one or more processors, cause the one or more processors to analyze the training feature vector using the first machine learning model to create a machine learning training output comprising an indication of whether the first machine learning model identified an error associated with the candidate training named entity, compare the machine learning training output with the labeling output to create a training output comparison that identifies one or more errors in the training output, and update one or more parameters of the first machine learning model based on the training output comparison. In a still further example, the classifier is initially configured to identify errors associated with candidate named entities recognized from a first document type and updating one or more parameters of the first machine learning model enables the classifier to identify errors associated with candidate named entities recognized from a second document type. In another example, the computer readable medium stores further instructions which, when executed by the one or more processors, cause the one or more processors to recognize the candidate named entity using a second machine learning model. In a further example, the feature vector includes one or more of a named entity label associated with the candidate named entity, a recognition accuracy prediction of the candidate named entity, a distance measure between the chunk and a previous chunk and/or a subsequent chunk, an embedding vector associated with the chunk, semantics of the chunk, and a similarity of the candidate named entity contained within the chunk and a named entity and/or a candidate named entity contained within a previously-identified chunk. In a still further example, removing the candidate named entity improves the accuracy of named entities recognized within the text. In another example, the computer readable medium stores further instructions which, when executed by the one or more processors, cause the one or more processors to recognize and process a plurality of candidate named entities.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

One growing area of application of automated document processing is the automated analysis of legal documents. For example, automated tools, such as those from Leverton GmbH, can be used to automate the process of reviewing large numbers of contracts, leases, title deeds, and other legal or financial documents during a due diligence process. To automate the analysis of these documents, an important step is to identify named entities in the legal documents. Named entities are textual elements (e.g., words, phrases, or strings) contained within the text of a document identifying information relevant to understanding or interpreting the document. Examples of named entities include proper nouns, including the names of persons or legal entities involved in the transaction embodied in a legal document, such as a party to an agreement, e.g., a landlord, a tenant, a buyer, a seller, a guarantor, mortgagor, mortgagee, lender, guarantor, a licensor, or a licensee. Named entities may also include other information relevant to understanding the transaction embodied in the document, such as addresses or locations, real estate properties, buildings, numbers, dates, and activities. Other examples of named entities may include the name of products or services purchased under an agreement, activities to be performed under an agreement, defined terms in an agreement, and effective dates of an agreement. The types of named entities present in a document may depend on the type of document.

For example, in analyzing a purchase agreement, it is often important to identify who the buyer and seller are. This may enable a better due diligence analysis of which companies a buyer is contracting with and thus exposed to. Another example is in the analysis of leases, where it is often important to identify a landlord and a tenant. Identifying and analyzing these individuals is often necessary to properly understand the scope of a portfolio of leases, as well as the reliability of the cash flow associated with the leases. Of course the named entity recognition problem also exists in other application areas, e.g., the analysis of financial documents, other agreements, and news articles. In fact, the named entity problem may also exist in application areas outside of document analysis. Named entity recognition may be used to better understand any sequence of words, e.g., a transcribed series of words extracted from an audio recording of spoken words.

When recognizing named entities, many named entity recognition (NER) systems utilize one or more heuristics developed by system creators. For example, an NER system may identify sequences of two capitalized words as named entities because most names are capitalized. State of the art and NER systems may also utilize a machine learning model to a identify named entities in a document. For example, a machine learning model may be trained to identify one or more named entities within the document. These models may be trained using a series of texts wherein named entities are sparsely distributed, as they typically are in legal and other documents. However, such heuristics and models can often falsely identify elements of the text as a named entity because the heuristics are static once created, especially if named entities are sparsely distributed throughout a document. To correct these false positives, some NER systems generate a prediction confidence measurement that may be based on the strength of a number of heuristics. Such systems may then filter identified named entities and remove entities with a low prediction probability.

However, filtering identified named entities in this manner ignores contextual information available in the document and in other named entities. For example, a candidate named entity identified far away in a document from similar named entities may suggest that the candidate named entity was incorrectly identified in a type of document where named entities typically occur in groups. In other examples, a candidate named entity identified near similar named entities may suggest that the candidate named entity was incorrectly identified in a type of document where named entities typically occur farther apart. Incorporating such contextual information with heuristics is difficult at a large scale because contextual relationships are complex when more than two labels are considered. Further, there may be other types of contextual information that are not obvious to system creators.

Additionally, different document types may utilize different heuristics and may have different kinds of pertinent contextual information. For example, a legal document such as a lease may include named entities in the text of the lease, whereas a financial statement may include named entities in a table preceding the text of the document. These heuristics can even change between documents of the same type. For example, a large commercial lease may include an extensive definitions section that identifies the named entities whereas a smaller residential lease may not contain a definitions section and may simply define the named entities within the agreement provisions. Accordingly, systems that rely solely on heuristics may have to be extensively redeveloped in order to properly analyze documents of different types.

One innovative procedure, described in the present disclosure that solves both of these problems is to use a machine learning model to identify falsely-identified candidate named entities. One approach to doing this involves extracting chunks of text that include candidate named entities and creating a feature vector that corresponds to each chunk. These feature vectors may include aspects of the candidate named entities and of their relationship with preceding or subsequent candidate named entities. For example, a feature vector may include a label indicating the type of named entity for the candidate named entity, as well as its distance to the preceding named entity. These feature vectors may then be analyzed by a machine learning model to identify false positives. To train the machine learning model, training chunks may be created that are labeled to indicate whether they correspond to a correctly-identified named entities. The model may then analyze training feature vectors corresponding to these training chunks and the model may be adjusted to better classify candidate named entities as correctly or incorrectly identified. Because the model is configured to be trained and updated automatically, rather than manually updated with new heuristics, such a system is also significantly easier to update for new types of documents. Further, because the system is configured to work with feature vectors, which may include many different types of features, the model is able to integrate new features that may be relevant to one document type but not to another.

Figure 1:
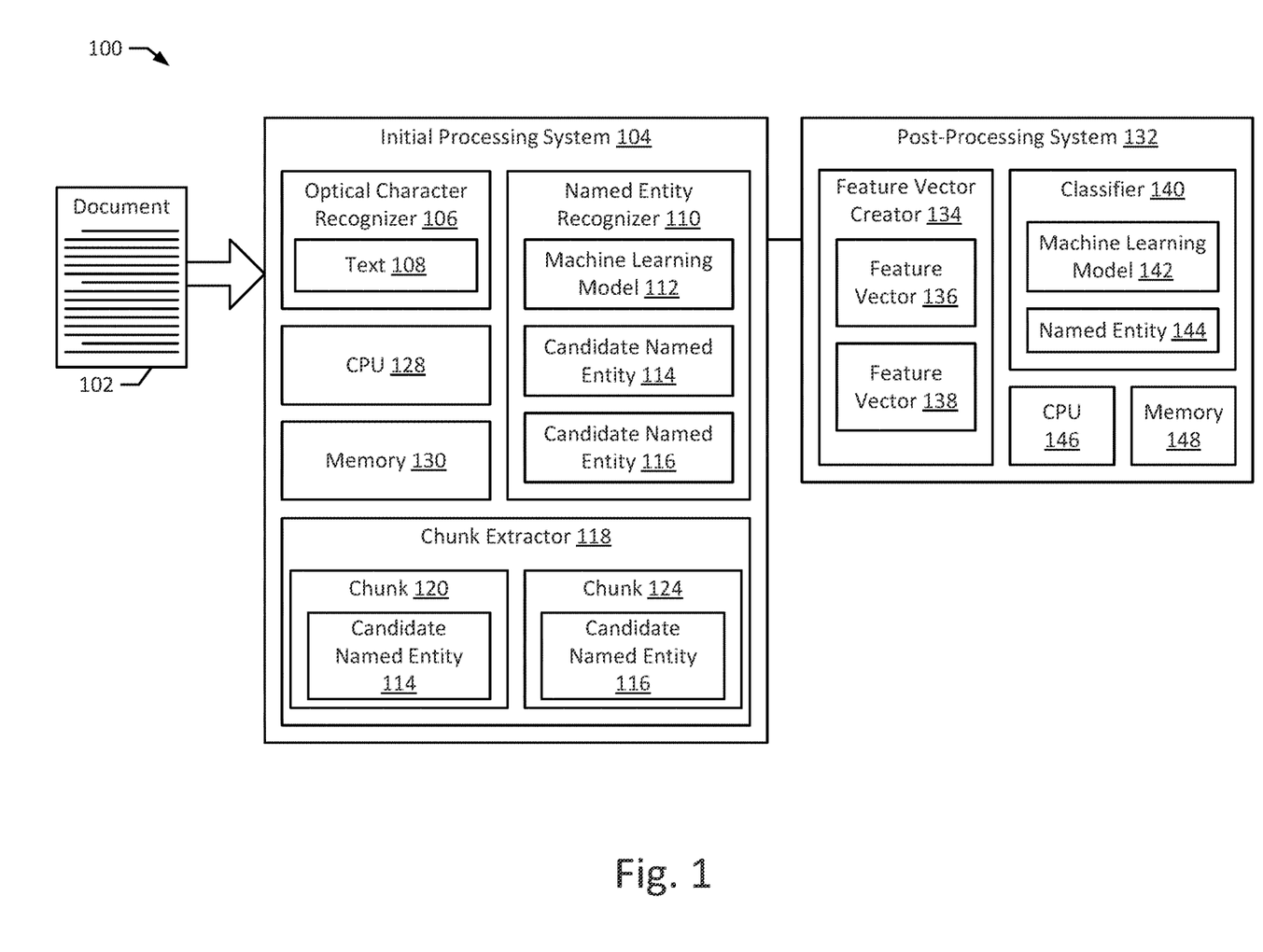
FIG. 1 illustrates a document processing system according to an example embodiment of the present disclosure.

FIG. 1 depicts a document processing system 100 according to an example embodiment of the present disclosure. The document processing system 100 includes a document 102, an initial processing system 104, and a post-processing system 132. The initial processing system 104 includes an optical character recognizer 106, a named entity recognizer 110, a chunk extractor 118, a CPU 128 and a memory 130. The optical character recognizer 106 further includes a text 108. The named entity recognizer 110 includes a machine learning model 112 and candidate named entities 114, 116. The chunk extractor 118 includes chunks 120, 124 that each include a candidate named entity 114, 116. The initial processing system 104 is connected to the post-processing system 132, which includes a feature vector creator 134, a classifier 140, a CPU 146, and a memory 148. The feature vector creator 134 stores feature vectors 136, 138 in an associated memory 130 and the classifier 140 includes a machine learning model 142 and a named entity 144.

The initial processing system 104 may be configured to receive a document 102 and recognize text within the document 102 to create a text 108. The document 102 may be stored on the memory 130 after the document 102 is received by the initial processing system 104 before the text 108 is recognized. The document 102 may be received from a document server configured to store multiple documents. The document 102 may be a document image, such as a scanned image of a paper document. In some implementations, if the document 102 is a document image, the initial processing system 104 may recognize the text using an optical character recognizer 106. The optical character recognizer 106 may be configured to perform optical character recognition on the document image to recognize the text 108 in the document 102. In other implementations, the document 102 may already have recognized and/or searchable text recognized (e.g., a word document or a PDF with recognized text). In such a case, the initial processing system 104 may not be required to recognize the text 108 and may instead continue processing the document 102 and the text 108.

The document 102 may be a particular document type. For example, the document 102 may be a lease agreement, a purchase sale agreement, a title insurance document, a certificate of insurance, a mortgage agreement, a loan agreement, a credit agreement, an employment contract, an invoice, a financial document, and an article. Although depicted in the singular, in some embodiments the initial processing system 104 may be configured to receive and process more than one document 102 at a time. For example, the initial processing system 104 may be configured to receive multiple documents of the same type (e.g., residential leases) or may be configured to receive multiple documents of multiple types (e.g., residential leases and commercial leases).

The named entity recognizer 110 may be configured to recognize one or more candidate named entities 114, 116 in the text 108. The candidate named entities 114, 116 may include one or more pieces of information that may be important to understanding the text 108, such as persons, organizations, locations, times, dates, quantities, monetary amounts, actions that must be performed, or other items of information. For example, the candidate named entities 114, 116 may include one or more of a landlord, a tenant, a buyer, a seller, a party to an agreement, an entity important to the document, and a defined term in a contract. The types of entities identified as candidate named entities 114, 116 may differ based on the document type corresponding to the document 102. For example, contact information for individuals other than a contract signatory may not be important to a lease contract but may be very important to business procurement contracts. Thus, when analyzing a text 108 deriving from a lease contract, the named entity recognizer 110 may not recognize candidate named entities 114, 116 for non-signatory individuals. However, when analyzing a text 108 deriving from a business procurement contract, the named entity recognizer 110 may be configured to recognize candidate named entities 114, 116 for non-signatory individuals.

The named entity recognizer 110 may be configured to recognize candidate named entities 114, 116 using heuristics, such as by identifying two adjacent capitalized words as a named entity. These heuristics may be provided by one or more programmers associated with initializing the system. Alternatively, the named entity recognizer 110 may be configured to recognize the candidate named entities using a machine learning model 112. The machine learning model 112 may be a neural network, such as a recurrent neural network or a convolutional neural network or another type of machine learning model, such as a conditional random field model or a Markov model. The named entity recognizer 110 may also be configured to use a combination of heuristics and a machine learning model 112 to recognize the candidate named entities 114, 116. When recognizing named entities, the named entity recognizer 110 may also generate an accuracy measurement that indicates a confidence level associated with the recognition of a candidate named entity 114, 116. For example, the accuracy measurement may be a measure of how well the candidate named entity 114, 116 complies with the combination of heuristics and the machine learning model 112.

As described above, different named entities may be important for different document types. To account for this, the named entity recognizer 110 may have a different set of heuristics and/or machine learning models 112 for different document types. The named entity recognizer may be configured to identify a document type for the document 102 and the text 108 and switch between heuristics and machine learning models 112 based on the document type. For example, a user may provide the document type or the named entity recognizer 110 may determine the document type based on metadata or other information associated with the document 102 and text 108, such as the title of the document 102 or a document type metadata field. In some embodiments, because of inherent errors with the set of heuristics and/or the machine learning model 112, one or more of the candidate named entities 114, 116 may not correspond to named entities 144 important to the document.

The chunk extractor 118 may be configured to extract one or more chunks 120, 124 from the text 108. Each of the chunks 120, 124 may contain one or more candidate named entities 114, 116. The chunks 120, 124 may also contain portions of the text surrounding the candidate named entities 114, 116. For example, the chunk extractor 118 may be configured to extract a chunk 120, 124 that includes the sentence containing the candidate named entity 114, 116. The chunk extractor 118 may also be configured to extract the paragraph containing the candidate named entity, or any other subset of the text 108. Further, the chunk extractor 118 may be configured to extract a certain number of words (e.g., 10 words) before and after the candidate named entity 114, 116 or a certain number of characters (e.g., 20 characters) before and after the candidate named entity 114, 116.

In some embodiments, the chunks 120, 124 may be extracted using heuristic rules based on the candidate named entities 114, 116 identified by the named entity recognizer 112 (e.g., by the machine learning model 112). In some embodiments, the named entity recognizer 110 may apply a series of labels to words that indicate a prediction as to whether the words indicate the beginning, middle, and end of a candidate named entity 114, 116. For example, the named entity recognizer 110 may apply labels such as "Landlord-Begin," "Landlord-Inside," and "Landlord-End" corresponding to the beginning, middle and end of a candidate named entity (e.g., the first name, middle initial, and last name of the landlord). Similar labels may also be used for a tenant. The chunk extractor 118 may then extract the chunks 120, 124 based on a series of rules that use the labels provided by the named entity recognizer 110. For example, if a sequence of labels includes a word labeled "Landlord-Begin" followed by a word labeled "Landlord-End," the chunk extractor 118 may create a chunk 120, 124 that contains the words associated with the "Landlord-Begin" and "Landlord-End." In another example, a sequence of labels may include two consecutive "Landlord-Begin" labels and the chunk extractor 118 may create two chunks, each containing the words associated with one of the "Landlord-Begin" labels.

The CPU 128 and the memory 130 may implement one or more aspects of the initial processing system 104, such as the optical character recognizer 106, the named entity recognizer 110, and the chunk extractor 118. For example, the memory 130 may store instructions which, when executed by the CPU 128 may perform one or more of the operational features of the initial processing system 104. Additionally, one or more of the optical character recognizer 106, named entity recognizer 110, and chunk extractor 118 may be implemented as a single software module or process. For example, a single software module or process may implement all three of the optical character recognizer 106, named entity recognizer 110, and chunk extractor 118. In another example, a single software module or process may implement the named entity recognizer 110 and chunk extractor 118.

The post-processing system 132 may be configured to receive the chunks 120, 124 for further processing to identify the candidate named entities 114, 116 that do not correspond to named entities 144 important to the document. The feature vector creator 134 may be configured to receive the chunks 120, 124 and create feature vectors 136, 138 associated with the chunks 120, 124. For example, feature vector 136 may be associated with chunk 120 and feature vector 138 may be associated with chunk 124. As described below, the feature vectors 136, 138 may contain one or more features associated with the chunks 120, 124 and the candidate named entities 114, 116.

The classifier 140 may be configured to receive the feature vectors 136, 138 and analyze the feature vectors 136, 138 for one or more errors associated with the candidate named entities 114, 116. The classifier 140 may be further configured to correct the one or more errors associated with the candidate named entities 114, 116. The classifier 140 may use a machine learning model 142 to analyze the feature vectors 136, 138. This machine learning model 142 may include a neural network such as a recurrent neural network or a convolutional neural network or another type of machine learning model such as a conditional random field model and a Markov model. The machine learning model 142 may differ from the machine learning model 112 of the named entity recognizer 110. In some configurations, this may be desirable because the machine learning model 112 may be configured to recognize candidate named entities 114, 116 in a text, and the candidate named entities 114, 116 may be sparsely distributed throughout the text. By contrast, because the machine learning model 142 analyzes feature vectors 136, 138 associated with candidate named entities 114, 116, the machine learning model 142 may not deal with sparsely distributed candidate named entities 114, 116. Thus, a machine learning model 112 that works well for recognizing candidate named entities 114, 116 may, in some cases, not be well-suited to perform the functions of the machine learning model 142 in analyzing the feature vectors 136, 138, which are associated with a dense distribution of identified candidate named entities 114, 116.

The machine learning model 142 may evaluate one or more features of the feature vectors 136, 138 to determine whether the corresponding chunks 120, 124 contain candidate named entities 114, 116 with associated errors. For example, the classifier 140 may determine that the candidate named entities 114, 116 are not named entities 144. The classifier 140 may also determine that the candidate named entities 114, 116 were identified as an incorrect type of named entity 144, or include a portion of the text 108 not associated with the named entity 144. The classifier 140 may further correct the errors associated with the candidate named entities 114, 116. For example, if the classifier 140 determines that candidate named entity 114 is incorrectly identified as a named entity and that candidate named entity 116 is correctly identified as a named entity, the classifier 140 may remove candidate named entity 114 as a potential named entity and may further designate candidate named entity 116 as a named entity 144. The classifier 140 may also correct other errors by, for example, correcting a named entity label that indicates an incorrect named entity type or by correcting the portion of the text 108 associated with the candidate named entity 114, 116.

The CPU 146 and the memory 148 may implement one or more of the post-processing system 132 features, such as the feature vector creator 134 and the classifier 140. For example, the memory 148 may store instructions which, when executed by the CPU 146 may perform one or more of the operational features of the post-processing system 132.

The system 100 may be implemented as one or more computer systems, which may include physical systems or virtual machines. For example, the initial processing system 104 and the post-processing system 132 may be implemented as separate computer systems. These computer systems may be networked, for example, the links between system components may be implemented by a network such as a local area network or the Internet. Alternatively, the initial processing system 104 and the post-processing system 132 may be implemented by the same computer system. In such examples, the CPU 128 and the CPU 146 may be implemented by the same CPU and the memory 130 and the memory 148 may be implemented by the same memory.

Figure 2:
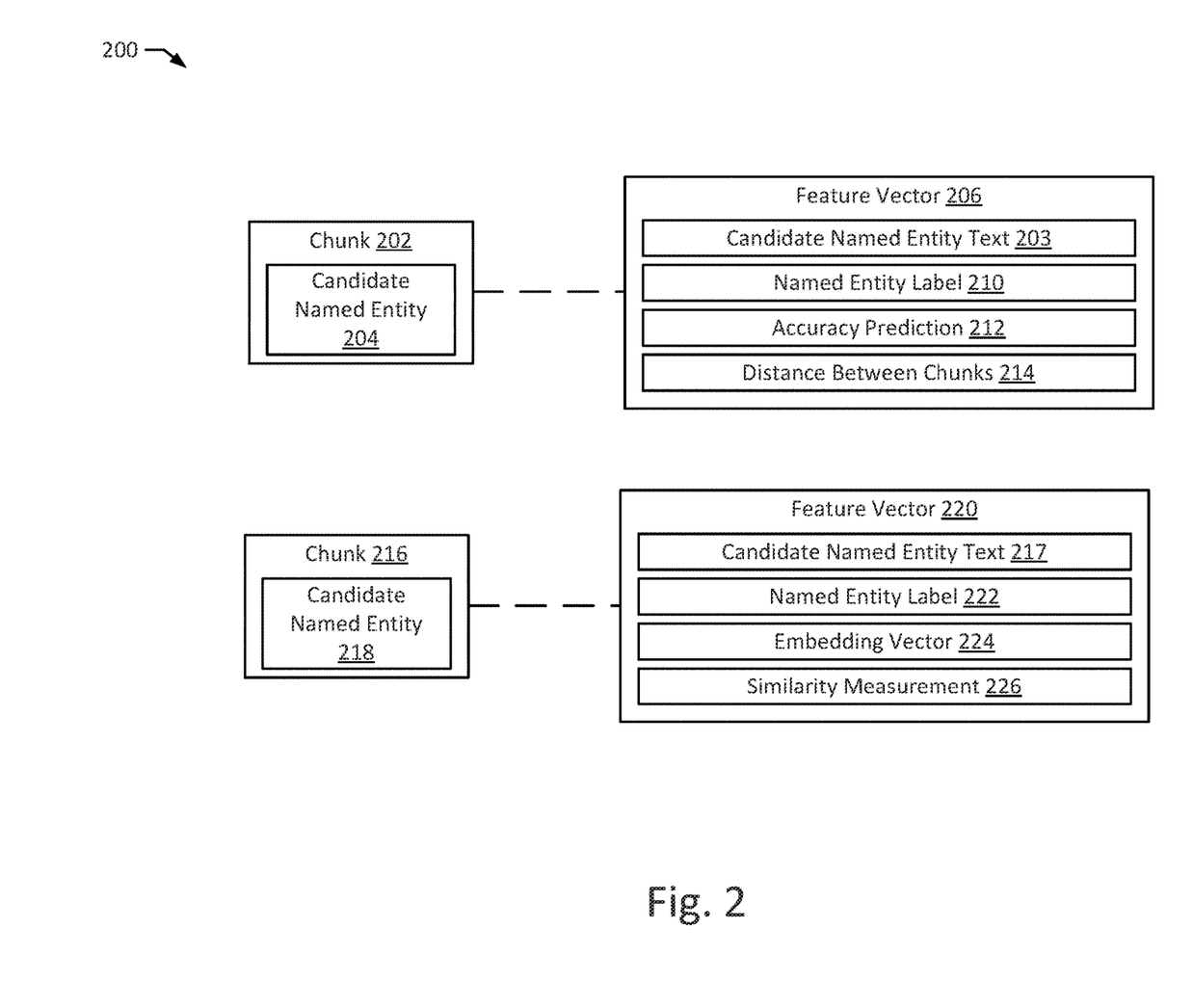
FIG. 2 illustrates a plurality of feature vectors according to an example embodiment of the present disclosure.

FIG. 2 depicts a plurality of feature vectors 200 according to an example embodiment of the present disclosure. FIG. 2 depicts feature vectors 206, 220. In some embodiments, as described above, the feature vectors 206, 220 may be used to analyze one or more candidate named entities 114, 116. For example, the feature vectors 206, 220 may be example embodiments of the feature vectors 136, 138 of the system 100. In some embodiments, the feature vectors 206, 220 may be associated with one or more chunks 202, 216. As depicted, feature vector 206 is associated with chunk 202 and feature vector 220 is associated with chunk 216. These associations may indicate that the feature vectors 206, 220 were created from features derived from the chunks 202, 216 or related to the candidate named entities 204, 206 contained within the chunks 202, 216.

The feature vectors 206, 220 may contain one or more features. These features may indicate one or more aspects of the text 108 relating to the chunks 202, 216 and the candidate named entities 204, 218. For example, the feature vector 206 contains a candidate named entity text 203, a named entity label 210, an accuracy prediction 212, and a distance between chunks 214 and the feature vector 220 contains a candidate named entity text 217, a named entity label 222, an embedding vector 224, and a similarity measurement 226. Although the feature vectors 206, 220 are depicted as containing different features, in many implementations it may be necessary that the feature vectors 206, 220 contain the same features to properly compare between the candidate named entities 204, 218 associated with the feature vectors 206, 220. In such implementations, the variety of features depicted in the features vectors 206, 220 may instead depict the features that may be selected to include in the feature vector 206, 220.

As depicted, the feature vectors 206, 220 both include the candidate named entity text 204, 218. The candidate named entity text 203, 217 may include a portion of the text 108 that includes the candidate named entity 204, 218. The feature vectors 210, 222 both include named entity labels 210, 222. The named entity labels 210, 222 may indicate which type of entity the candidate named entity 204, 218 is identified to be. For example, the named entity label 210, 222 may indicate that the candidate named entity 204, 218 is one or more of a buyer, a seller, a landlord, a tenant, a business, a product, or any other entity important to the document, as discussed above.

The accuracy prediction 212 may be an indication of the predicted accuracy of the identification of the candidate named entity 204, 218. For example, a named entity recognizer 110 may generate the accuracy prediction 212 when the named entity recognizer 110 recognizes the candidate named entities 204, 218 in the text 108 as described above. A low accuracy prediction may suggest that there is an error associated with the candidate named entity 204, 218.

The distance between chunks 214 may indicate a distance measurement between the chunk 202 and a prior chunk of a text 108 or a distance measurement between the chunk 202 and a subsequent chunk of a text 108. For example, if the chunk 216 is the next chunk following the chunk 202 in a text 108, the distance between chunks 214 may be the distance to the next chunk 216. The distance between chunks 214 may be measured as a count of the characters, words, sentences, and/or paragraphs that separate the chunk 202 from the subsequent or prior chunk. The distance between chunks 214 may also be measured in sections or subsections of a document as defined in the headings, or as defined for particular document types. In other embodiments, the distance between chunks 214 may be measured as a physical distance separating in the document 102. In some examples, a large distance between chunks may indicate that there is an error associated with a candidate named entity 204, 218. For example, if many candidate named entities are defined near one another and thus have a small distance between chunks 214 and one candidate named entity 202 has a large distance between chunks 214, the large distance between chunks 214 may indicate that the candidate named entity 202 is associated with an error.

The embedding vector 224 may be a word-to-vector representation of one or more words contained in the chunk 216 or the candidate named entity text 217. The embedding vector 224 may include one or more pieces of information regarding the semantics of the candidate named entity text 217, including words that are similar to the words contained in the text of the chunk 216. The embedding vector 224 may be provided by a third party and may be stored in a memory 130, 148. The information contained in the embedding vector 224 may be useful for determining whether there is an error associated with the candidate named entity 218. For example, in lease agreements, typical named entities may include the landlord and the tenant. However, a particular version of a lease may identify the individuals as "lessor" and "lessee." The embedding vector 224 may indicate that these words are analogous to landlord and tenant and thus enable the proper classification of the candidate named entity 218.

The similarity measurement 226 may include a measure or indication of the similarity between the candidate named entity 218 and a previous candidate named entity in a text 108. For example, if the individual "John Doe" has already been identified as a candidate named entity in a text 108, and the candidate named entity text 217 is identified as "John Doe" or "Doe," the similarity measurement 226 may indicate that the candidate named entity 218 is similar to the John Doe candidate named entity. In some embodiments, this indication may suggest there is an error associated with the candidate named entity 218. For example, in certain agreements, individuals may not be able to accompany more than one role. Thus an indication that John Doe is acting in two roles may suggest that Doe is not a new named entity because he is already a candidate named entity. One implementation of the similarity measurement 226 may use a binary indicator to identify when the candidate entity text 217 exactly matches the candidate entity text of a previous candidate named entity. In another implementation, the similarity measurement 226 may calculate the Levenshtein distance between the candidate entity text 217 and the candidate entity text of a previous candidate named entity. In a still further implementation, the similarity measurement 226 may be calculated by counting the number of equal character triples (e.g., trigrams) between the candidate entity text 217 and the candidate entity text of a previous candidate named entity and normalizing the result.

The similarity measurement 226 may also include a measure or indication of the similarity between the named entity label 222 of the candidate named entity 218 and the named entity label of another candidate named entity. For example, if there is already a candidate named entity in a purchase agreement associated with the buyer, and the candidate named entity 218 is identified as the buyer, the similarity measurement 226 may indicate that the candidate named entity 218 is similar to the named entity. In some embodiments, the candidate named entity 218 being similar to a previous named entity may suggest there is an error associated with the candidate named entity 218. For example, a purchase agreement may not be able to have more than one buyer. Thus an indication that there is a candidate named entity 218 for a buyer when there is already a candidate named entity buyer may suggest that the candidate named entity 218 is erroneous. When measuring the similarity between the named entity label 222 of the candidate named entity 218 and the named entity label of a previous candidate named entity, the similarity measurement 226 may be calculated using implementations and calculations similar to those discussed above in connection with measuring the similarity between the named entity text 217 and the named entity text of a previous candidate named entity.

In some embodiments, the feature vectors 206, 220 may be created by a feature vector creator 134. In creating the feature vectors 206, 220, the feature vector creator 134 may analyze text contained within the chunks 202, 216 to ascertain one or more features. The feature vector creator 134 may also interact with other systems, such as the named entity recognizer 110, to gather features associated with the chunks 202, 216. The feature vector creator 134 may further interact with external systems, such as an embedded vector provider, to gather features associated with the chunks 202, 216. In some embodiments, the feature vector creator 134 may also create the feature vectors 206, 220 at the same time the chunks 202, 216 are created.

Figure 3:
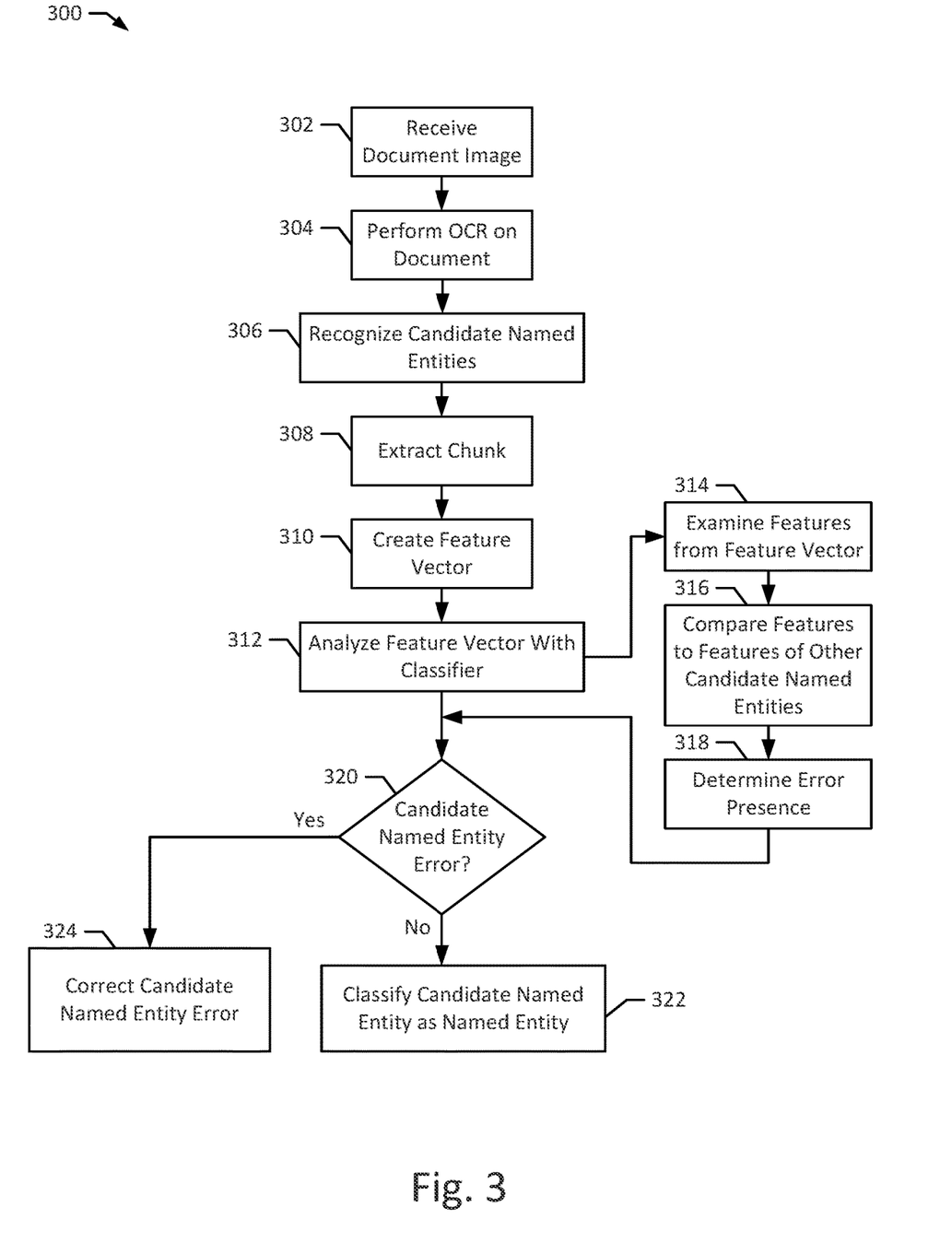
FIG. 3 illustrates a flow chart of an example method according to an example embodiment of the present disclosure.

FIG. 3 depicts a flow chart of an example method 300 according to an example embodiment of the present disclosure. The method 300, when executed, may be used to analyze feature vectors 136, 138, 206, 220 associated with one or more candidate named entities 114, 116, 204, 208 in order to identify whether the candidate named entities 114, 116, 204, 208 are not named entities 144. The method 300 may be implemented on a computer system, such as the document processing system 100. For example, one or more steps of the method 300 may be implemented by the initial processing system 104 and/or the post-processing system 132. The method 300 may also be implemented by a set of instructions stored on a computer readable medium that, when executed by a processor, cause the computer system to perform the method. For example, all or part of the method 300 may be implemented by the CPUs 128, 146 and the memories 130, 148. Although the examples below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 may begin with an initial processing system 104 receiving a document 102 (block 302). The document 102 may be associated with one or more document types that the initial processing system 104 is configured to process, as described above. The initial processing system 104 may then perform OCR on the document 102 and generate a text 108 (block 304). The initial processing system 104 may perform OCR using an optical character recognizer 106. After generating the text 108, the method 300 may proceed with recognizing a candidate named entity 114, 116, 204, 218 (block 306). The candidate named entity 114, 116, 204, 218 may be recognized using a named entity recognizer 110 and one or both of a set of heuristics and a machine learning model 112, as described above. In some embodiments, the document 102 may already include an associated text 108. In such embodiments, the method 300 may directly proceed to recognize named entities (block 306) instead of performing OCR on the document (block 304).

The chunk extractor 118 may then extract a chunk 120, 124, 202, 216 from the text 108 (block 308). The chunk 120, 124 may contain the candidate named entity 114, 116, 204, 218 and may contain a portion of the text 108 surrounding the candidate named entity 114, 116, 204, 218. In some embodiments, the chunk 120, 124 may also contain other aspects of the text 108, such as the document type associated with the document 102. The feature vector creator 134 may then create a feature vector 136, 138, 206, 220 associated with the chunk 120, 124, 202, 216 and the candidate named entity 114, 116, 204, 218 (block 310). The feature vector 136, 138, 206, 220 may contain one or more features associated with the chunk 120, 124, 202, 216 and the candidate named entity 114, 116, 204, 218 as described above. In some embodiments, the chunk extractor 118 may extract the chunk 120, 124, 202, 216 and the feature vector creator 134 may create the feature vector 136, 138, 206, 220 in the same step. For example, the chunk extractor 118 and the feature vector creator 134 may be implemented as a single module or component that creates feature vectors 136, 138, 206, 220 at the same time it extracts the chunk 120, 124, 202, 216.

The classifier 140 may then analyze the feature vector 136, 138, 206, 220 for one or more indications of an error associated with the candidate named entity 114, 116, 204, 218. As described above, the features contained within the feature vector 136, 138, 206, 220 that the classifier 140 analyzes may be different for documents of different document types. In some embodiments, the method 300 may then proceed with the classifier 140 examining the features from the feature vector 136, 138, 206, 220 (block 314). For example, the feature vector 136, 138, 206, 220 may include an accuracy prediction 212 that indicates the named entity recognizer 110 had a low confidence when the named entity recognizer 110 recognized the candidate named entity 114, 116, 204, 218. This may suggest that the candidate named entity 114, 116, 204, 218 was incorrectly identified. In another example, the feature vector 136, 138, 206, 220 may indicate that the candidate named entity 114, 116, 204, 218 was mentioned in a definitions section of a business procurement contract. This may suggest that the candidate named entity 114, 116, 204, 218 was more likely to be correctly identified.

The classifier 140 may then compare features from the feature vector 136, 138, 206, 220 to features of other candidate named entities 114, 116, 204, 218 (block 316). For example, some of the features from the feature vector 136, 138, 206, 220 may include information on other candidate named entities 114, 116, 204, 218. For example, the distance between chunks 214 may include the distance to a previous chunk and the similarity measurement 226 may include a similarity between the candidate named entity 114, 116, 204, 218 and a previous named entity, as described above. As described above, either of these features may indicate that the candidate named entity 114, 116, 204, 218 was correctly or incorrectly identified. In some embodiments, these features may not be included in the feature vector 136, 138, 206, 220 and the classifier 140 may determine the comparison itself. For example, instead of receiving a similarity measurement 226, the classifier 140 may compare the candidate named entity to previously-identified candidate named entities and determine the similarity.

The classifier 140 may then determine the presence of an error (block 318). As described above, each of the features of the feature vector 136, 138, 206, 220 may suggest that the candidate named entity 114, 116, 204, 218 is more likely or less likely to be correctly identified as a potential named entity. To determine the presence of an error, the classifier 140 may combine the suggestions of the features into a final determination of the presence of an error. In some implementations, the classifier 140 may ignore one or more features and in further implementations the classifier 140 may weight each of the features differently. For example, the classifier 140 may determine that the similarity measurement 226 and the distance between chunks 214 are important and that the embedding vector 224 is not important. The classifier 140 may then weight the similarity measurement 226 and the distance between chunks 214 higher than the embedding vector 224. The classifier 140 may use a machine learning model 142 to perform this determination and may train the machine learning model 142 to determine the weights for each of the features, as described in greater detail below. Additionally, the classifier 140 may have more than one machine learning model 142 and may use a different machine learning model 142 for documents of different document types. Further, a machine learning model 142 may be configured to analyze a second document type by training a machine learning model configured to analyze a first document type as described below.

All or some of the blocks 314, 316, 318 may be optional. For example, the method 300 may be performed by only examining the features of the feature vector 136, 138, 206, 220 (block 314) and determining the presence of an error (block 318). In another example, the method 300 may only determine the presence of an error (block 318).

The method 300 may then proceed with evaluating whether the classifier 140 has determined the presence of an error (block 320). If the classifier 140 determines that there is no error, the classifier 140 may proceed to classify the candidate named entity 114, 116, 204, 218 as a named entity 144 within the text 108 (block 322). To do this, the classifier 140 may add the candidate named entity 114, 116, 204, 218 to a list of named entities 144 associated with the text 108 for further processing.

If the classifier 140 determines that there is an error associated with the candidate named entity 114, 116, 204, 218, the classifier 140 may correct the error (block 324). For example, if the classifier determines that the candidate named entity 114, 116, 204, 218 includes an incorrect named entity label 210, 222, the classifier 140 may replace the named entity label 210 with a corrected named entity label. In another example, if the classifier 140 determines that the candidate named entity 114, 116, 204, 218 includes an incorrect portion of the text 108, the classifier 140 may correct the candidate named entity 114, 116, 204, 218 by removing the extraneous portion of the text 108 or by supplementing the candidate named entity 114, 116, 204, 218 with a missing portion of the text 108. In the preceding two examples, after correcting the candidate named entity 114, 116, 204, 218, the classifier 140 may proceed to classify the candidate named entity candidate named entity 114, 116, 204, 218 as a named entity as discussed above in connection with block 322. However, in a third example, the classifier 140 may determine that the candidate named entity 114, 116, 204, 218 was incorrectly identified as a potential named entity. To correct this error, the classifier may eliminate the candidate named entity 114, 116, 204, 218 as a potential named entity. In this or similar examples, the method 300 may thus finish at block 324.

Although the method 300 is discussed in the context of a single candidate named entity 114, 116, 204, 218, the method 300 may be performed on multiple candidate named entities 112, 114, 204, 218. For example, the text 108 may contain multiple candidate named entities 112, 114, 204, 218 and the method 300 may be performed on each of the candidate named entities 112, 114, 204, 218 in order to improve the accuracy of the recognized named entities. The candidate named entities 112, 114, 204, 218 may be analyzed using the method 300 individually or in parallel depending on the implementation.

FIGS. 4A to 4E depict an example named entity recognition procedure 400 according to an example embodiment of the present disclosure. In some embodiments, the procedure 400 may be performed according to a method for analyzing feature vectors 136, 138, 206, 220 associated with one or more candidate named entities 114, 116, 204, 218 in order to identify whether the candidate named entities 114, 116, 204, 218 are named entities 144, such as the method 300. As described in greater detail below, the steps performed in conjunction with the procedure 400 may be performed by one or more of the initial processing system 104 and the post-processing system 132.

Figure 4A:
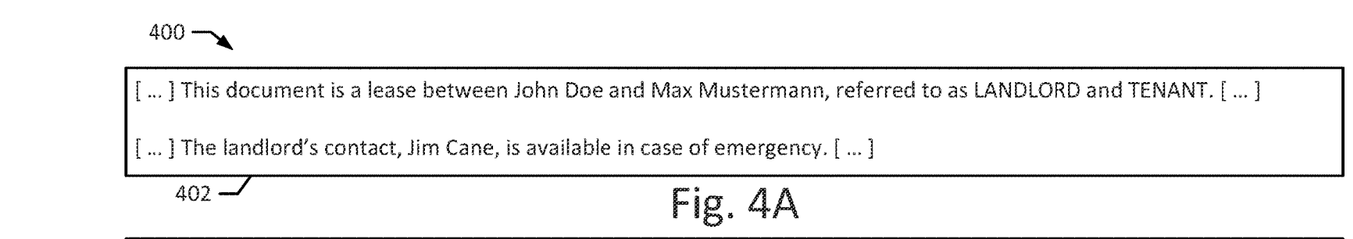
FIGS. 4A to 4E illustrate an example named entity recognition procedure according to an example embodiment of the present disclosure.
Figure 4B:
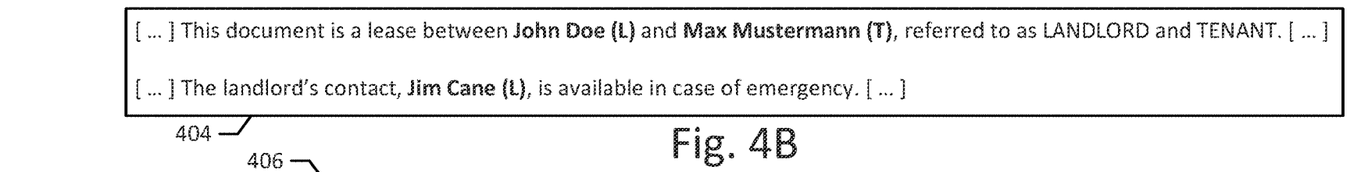

The procedure 400 may begin in FIG. 4A with the text 402. The text 402 may have been extracted from a document 102, which may be a particular document type. In this example, the text 402 was extracted from a lease agreement between a landlord and a tenant. The text 402 may include one or more named entities, each of which is important to properly understanding the text 402. In this example, John Doe may be a named entity as the landlord of the agreement and Max Mustermann may be a named entity as the tenant of the agreement. However, Jim Cane may not be important to understanding this agreement as he is only needed as a point of contact in the case of an emergency. Jim Cane may also be mentioned in a separate portion of the agreement, such as an emergency contacts portion of the agreement. Thus, although Jim Cane is named in the agreement, Jim Cane may not be a named entity of the text 402.

The text 402 may then be processed by a named entity recognizer 110 to recognize the named entities in the text 402. The results from the named entity recognizer 110 may be depicted in the recognized text 404 of FIG. 4B. Here, the bolded text indicates the portion of the text 402 that the named entity recognizer 110 recognized as a candidate named entity and the label is listed after the candidate named entity. The named entity recognizer 110 has correctly identified John Doe as the landlord in the agreement. The named entity recognizer 110 has also correctly recognized Max Mustermann as the tenant. However, the named entity recognizer 110 has also incorrectly recognized Jim Cane as the landlord.

Figures 4C, 4D, 4E:
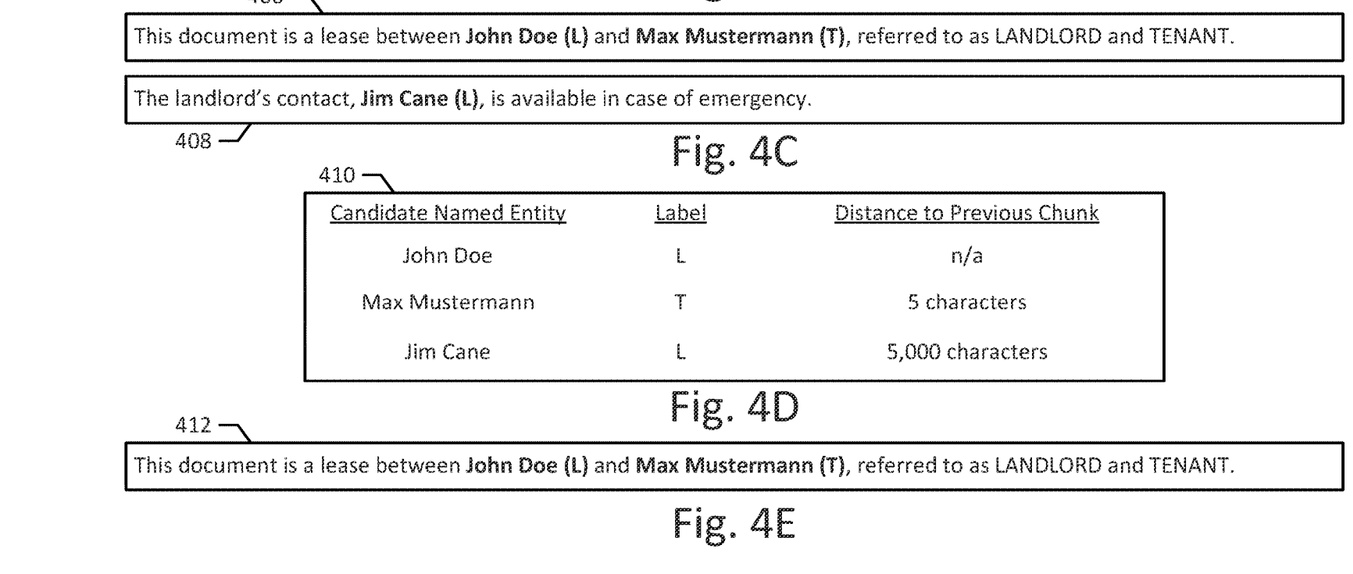

The recognized text 404 may then be processed by a chunk extractor 118 to extract the chunks 406, 408 that contain the candidate named entities depicted in FIG. 4C. Here, the chunk 406 contains both the John Doe and Max Mustermann candidate named entities. In this example, the chunk 406 contains multiple candidate named entities, but in other examples there may be separate chunks for each candidate named entity. Here, however, the chunk extractor 118 included John Doe and Max Mustermann in the same chunk 406 because they were in the same sentence and put Jim Cane in a separate chunk 408 because Jim Cane was mentioned in another part of the text 402.

The chunks 406, 408 may then be processed by a feature vector creator 134 to create features vectors associated with the candidate named entities in the chunks 406, 408. These feature vectors are depicted in the table 410. For example, the feature vector corresponding to John Doe includes the name John Doe as the candidate named entity, an indication that John Doe was recognized as a landlord and an indication that there is no distance between John Doe and the previous chunk because the chunk 406 is the first chunk extracted from the text 402. The feature vector corresponding to Max Mustermann includes the name Max Mustermann, an indication that Max Mustermann was recognized as the tenant in the agreement and an indication that the previous chunk (i.e., John Doe) has a distance of 5 characters. Because the chunk 406 contains two candidate named entities, the distance between chunk measurement measures the distance between the candidate named entities. In another implementation, the distance to previous chunk may instead be set to zero characters to indicate that the candidate named entities John Doe and Max Mustermann are in the same chunk 406. The third feature vector corresponding to Jim Cane includes the candidate named entity Jim Cane, the incorrect label indicating he was identified as the landlord under the agreement, and an indication that the chunk 408 is 5,000 characters amanner from the previous chunk (i.e., chunk 406) in the text 402.

The feature vectors summarized in the table 410 may then be analyzed by a classifier 140 to identify errors associated with the candidate named entities. In this example, the classifier 140 may analyze the distance to previous chunk measurement and notice that the measurement for Jim Cane has a significantly larger distance measurement than the measurement corresponding to Max Mustermann. This may indicate that Jim Cane is mentioned in a different part of the agreement than the other two candidate named entities and thus that there is likely an error associated with the Jim Cane candidate named entity. The classifier 140 may also notice that Jim Cane is identified as the landlord under the agreement, even though John Doe is identified as the landlord earlier in the document. Based on the parameters established when the machine learning model 142 associated with the classifier 140 was trained, the classifier 140 may determine that the earlier identification of John Doe as the landlord is more likely to be correct based off of the structure of the lease agreements analyzed during training. Thus, Jim Cane's subsequent identification as landlord may suggest there is an error associated with the Jim Cane candidate named entity. Accordingly, the classifier 140 may determine that Jim Cane was falsely identified as a named identity and remove Jim Cane as a potential named entity. The classifier may also determine that the John Doe and Max Mustermann candidate named entities were correctly identified and may classify them as named entities in the post-processed text 412 of FIG. 4E. Thus, in this example, the classifier 140 was able to incorporate the contextual information captured in the feature vectors to correctly discern that Jim Cane was incorrectly identified as a named entity.

In some instances, the techniques discussed above may be used to analyze multiple documents 102 (e.g., a collection of related documents 102). For example, the collection of documents 102 could include a lease and one or more amendments to the lease. The lease may be analyzed by the system 100 (e.g., according to the method 300) to identify John Doe as the landlord and Max Mustermann as the tenant. However, one or more of the amendments may also designate a new landlord for a property associated with the lease. For instance, an amendment may change the identity of the party acting as a landlord as a result of a property sale (e.g., from "John Doe" to "Apartments Inc.").

In such instances, the method 300 may be performed on the whole collection of documents 102. While performing the method 300, the named entity recognizer 110 may recognize both John Doe and Apartments Inc. as candidate named entities 114, 116, 204, 218 for the current landlord responsible under the lease. Each of these candidate named entities 114, 116, 204, 218 may then be analyzed similar to the analysis performed on candidate named entities 114, 116, 204, 218 from a single document 102. For example, the feature vectors 136, 138, 206, and 220 associated with each of the candidate named entities 114, 116, 204, 218 may include a document type identifier (e.g., a designation as to whether the originating document is a contract, a lease, an amendment to a contract or a lease, or any of the other types of documents discussed herein). In particular, the document type for the feature vector 136, 138, 206, 220 associated with John Doe may indicate that the candidate named entity 114, 116, 204, 218 originated from a lease agreement, and the document type for the feature vector 136, 138, 206, 220 associated with the Apartments Inc. may indicate that the candidate named entity 114, 116, 204, 218 originated from an amendment. Based on these identifications, the machine learning model 142 may identify the Apartments Inc. candidate named entity 114, 116, 204, 218 as the more recent, and therefore correct, named entity 144 for the current landlord under the agreement. In certain implementations, the features vectors 136, 138, 206, 220 may also include other features (e.g., an effective date of the originating document 102) to help distinguish between multiple amendments to the same document 102.

Figure 5:
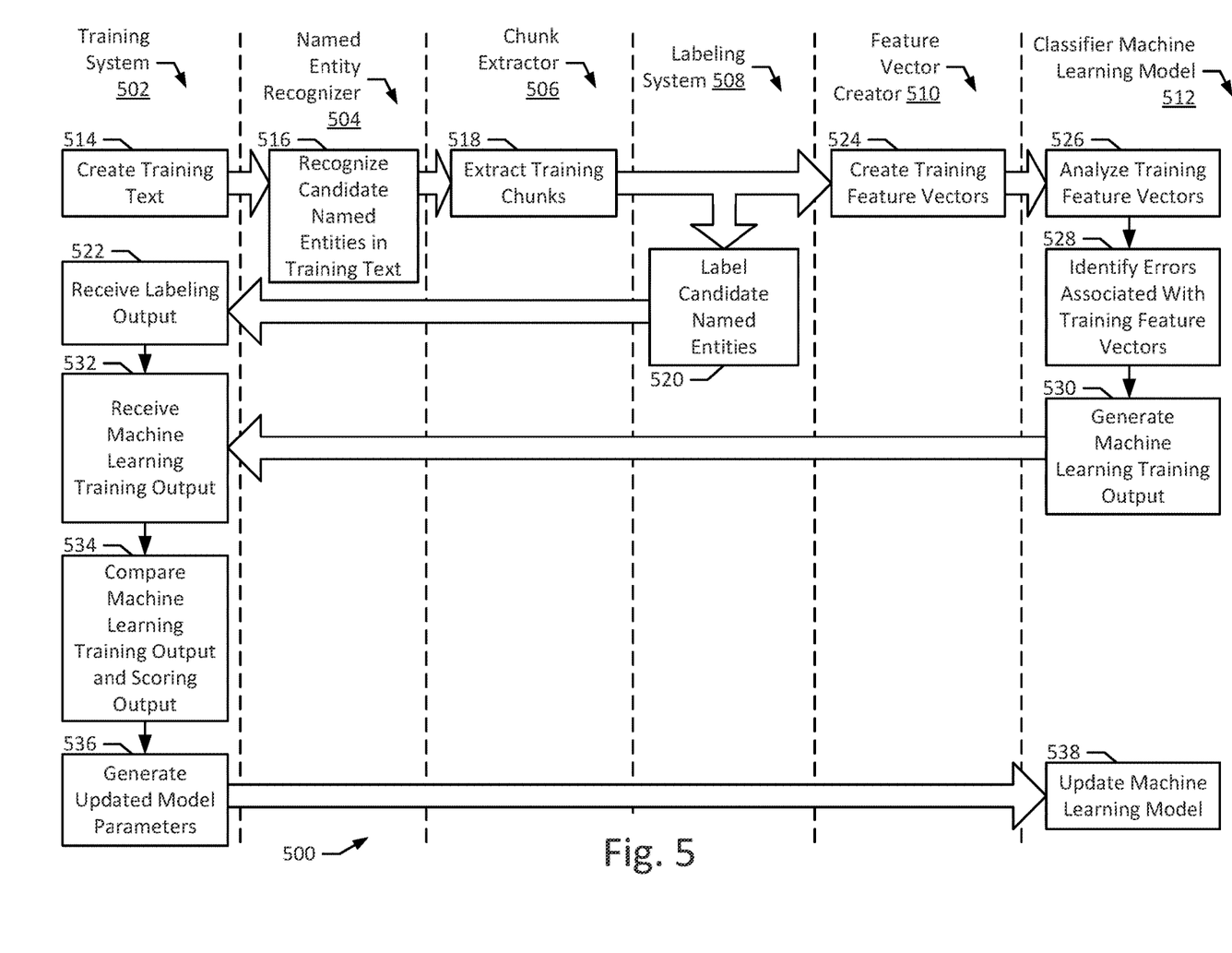
FIG. 5 illustrates a flow diagram of an example method according to an example embodiment of the present disclosure.

FIG. 5 depicts a flow diagram of an example method 500 according to an example embodiment of the present disclosure. The flow diagram includes a training system 502, a named entity recognizer 504, a chunk extractor 506, a labeling system 508, a feature vector creator 510, and a classifier machine learning model 512. The training system 502 may be configured to orchestrate the operation of the method 500 and generate updated model parameters based on the outputs generated during the training, as detailed below. In some embodiments, the training system 502 may be a implemented as part of a post-processing 132 or a classifier 140. The named entity recognizer 504 may be implemented as the named entity recognizer 110 and may include the machine learning model 112. The chunk extractor 506 may be implemented as the chunk extractor 118. The labeling system 508 may be a system that labels candidate named entities 114, 116, 204, 218 with an indication of the correct named entity classification that is desired for each candidate named entity 114, 116, 204, 218. The labeling system 508 may include one or both of a manual labeling system and an automatic labeling system. The feature vector creator 510 may be implemented by the feature vector creator 134. The classifier machine learning model 512 may be implemented as the machine learning model 142 of the classifier 140.

The method 500 may be used to train one or more machine models 512, 142 associated with a classifier 140. Training the classifier machine learning model 512 may improve the accuracy of the classifier machine learning model 512 at recognizing named entities in a particular document type. Alternatively, training the classifier machine learning model 512 may enable the classifier machine learning model 512 to recognize named entities in a new document type. For example, the classifier machine learning model 512 may be initially trained to recognize named entities 144 in business procurement contracts and, after completing the method 500, the classifier machine learning model 512 may be able to recognize named entities 144 in commercial leases. In some embodiments, the method 500 may be performed more than once in order to train the classifier machine learning model 512. In other embodiments, the method 500 may only need to be performed once in order to properly train the classifier machine learning model 512. A machine learning operator, such as an NER system developer, may determine the number of times the method 500 is performed. Alternatively a training system 502 may determine the number of times the method 500 is performed. For example, the training system 502 may repeat the method 500 until the classifier machine learning model 512 is able to recognize named entities in a document type with a particular level of accuracy.

The method 500 may be implemented on a computer system, such as the document processing system 100. For example, method 500 may be implemented in whole or in part by the initial processing system 104 and/or the post-processing system 132. The method 500 may also be implemented by a set of instructions stored on a computer readable medium that, when executed by a processor, cause the computer system to perform the method. For example, all or part of the method 500 may be implemented by the CPUs 128, 146 and the memories 130, 148. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

Additionally, FIG. 5 depicts multiple communications between the training system 502, the named entity recognizer 504, the chunk extractor 506, the labeling system 508, the feature vector creator 510, and the classifier machine learning model 512. These communications may be transmissions between multiple pieces of hardware or may be exchanges between different programmatic modules of software. For example, the communications may be transmissions over a network between multiple computing systems, such as the Internet or a local networking connection. These transmissions may occur over a wired or wireless interface. Other communications may be exchanges between software modules, performed through an application programming interface (API), or other established communication protocols.

The method 500 may begin with the training system 502 creating a training text (block 514). The training system 502 may create the training text by using an optical character recognizer 106 to extract text from a document 102. Alternatively, the training system 502 may be connected to or contain a memory that stores training texts and may select one of the training texts for use in training the classifier machine learning model 512. The training system 502 may create the training text based on the purpose for training the classifier machine learning model 512. For example, if the classifier machine learning model 512 is being trained to process a new document type, the training system 502 may create the training text to include text associated with the new document type. In another example, if the classifier machine learning model 512 is being trained to improve its accuracy, the training system 502 may create a training text that includes particularly difficult portions of text.

The named entity recognizer 504 may then recognize candidate named entities in the training text (block 516). These candidate named entities may be recognized using a set of heuristics or a machine learning model 112, as described above. The chunk extractor may then receive the candidate named entities and extract training chunks from the training text that include the candidate named entities (block 506).

The labeling system 508 may then label the candidate named entities (block 520). In some implementations, the candidate named entities are manually or automatically labeled with indications of the correct named entity status, which may include both an indication of whether the candidate named entity is an actual named entity and the correct named entity label for the candidate named entity. The training system 502 may then receive the labeling output (block 522). However, although depicted as occurring during the method 500, in some embodiments the candidate named entities may be labeled prior to performing the steps of the method 500. For example, the candidate named entities may be labeled beforehand and the labeling output may be stored on a memory contained within or connected to the training system 502. Thus, instead of receiving the labeling output from the label system 508 at block 522, the training system 502 may instead retrieve the labeling output from the memory.

The feature vector creator 510 may then create training feature vectors based on the training chunks (block 524). As described above in connection with the feature vectors 136, 138, 206, 220, the features may contain one or more pieces of contextual information regarding the training chunks. The classifier machine learning model 512 may then receive and analyze the training feature vectors (block 526). The classifier machine learning model 512 may analyze the training feature vectors in the same manner as discussed above in connection with feature vectors 136, 138, 206, 220. In fact, the classifier machine learning model 512 may be trained better if the classifier machine learning model 512 analyzes the training feature vectors in the same manner the classifier machine learning model 512 analyzes feature vectors 136, 138, 206, 220 because doing so may produce a better training result and thus further improve the accuracy or configuration of the classifier machine learning model 512. Similarly, the classifier machine learning model 512 may then identify errors associated with the training feature vectors using techniques similar to those discussed above in connection with the feature vectors 136, 138, 206, 220 (block 528).

The classifier machine learning model 512 may then generate a machine learning training output that includes indications of which training entities the classifier machine learning model 512 did or did not identify errors for (block 530). For example, the machine learning output may include a list of all of the candidate named entities associated with the training feature vectors and an indication of whether the classifier machine learning model 512 identified an error with each of the candidate named entities. If the classifier machine learning model 512 did identify an error associated with a particular candidate named entity, the machine learning training output may include a summary or description of the error, as well as any corrective action the classifier machine learning model 512 may deem adequate to correct the error. In some embodiments, the classifier machine learning model 512 may be configured to format the machine learning training output to be similar to the formatting of the labeling output.

The training system 502 may then receive the machine learning training output (block 532) and compare the machine learning training output to the labeling output (block 534). The training system 502 may compare each candidate named entity identified in the labeling output determine whether the classifier machine learning model 512 correctly identified the presence or lack of an error associated with the candidate named entity. If the classifier machine learning model 512 did correctly identify the presence of an error, the training system 502 may then determine whether the classifier machine learning model 512 determine the proper manner to correct the error by comparing an identified corrective action to a labeled corrective action.

Based on the comparison at block 534, the training system 502 may then generate updated model parameters (block 536). The updated model parameters may be generated to improve the accuracy of the classifier machine learning model 512 by, for example, improving the accuracy of the classifier machine learning model 512 at identifying errors associated with the candidate named entities or at identifying corrective actions in response to identified errors. The updated model parameters may be generated by, for example, adjusting the weights assigned to particular features of the training feature vectors. For example, if the classifier machine learning model 512 is being trained on a type of document that has named entities distributed throughout the text, generating the updated model parameters may include lowering the weight associated with the distance between chunks feature 214. In other embodiments, generating updated model parameters may also include configuring the feature vector creator 510 to include additional features in the training feature vectors at block 524. For example, if the classifier machine learning model 512 is being trained to process a document type with inconsistent language, the feature vector creator 510 may be configured to include an embedding vector 224 in the training feature vectors. The training system 502 may be configured to automatically generate the updated model parameters, or may be configured to have the updated model parameters generated manually, such as by a training system operator or document analyst, or may be configured to generate the updated model parameters both automatically and manually. The classifier machine learning model 512 may then receive the updated model parameters and be updated to incorporate the updated model parameters (block 538). The method may then repeat again beginning at block 514 to further train the model as discussed above.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A computer-implemented method, comprising:
recognizing a candidate named entity within a text;
extracting a first subset of the text that contains the candidate named entity;
analyzing, with a classifier, one or more features of the first subset of the text to identify an error associated with the candidate named entity; and
correcting the error associated with the candidate named entity.

2. The method of claim 1, further comprising:
storing a document image in a memory; and
recognizing the text from the document image.

3. The method of claim 1, wherein the error associated with the candidate named entity is that the candidate named entity is not a named entity and correcting the error associated with the candidate named entity includes removing the candidate named entity as a potential named entity in the text.

4. The method of claim 1, wherein the classifier analyzes the one or more features using a first machine learning model.

5. The method of claim 4, wherein the first machine learning model includes one or more of a recurrent neural network, a convolutional neural network, a conditional random field model, and a Markov model.

6. The method of claim 4, further comprising:
receiving a labeled training text comprising (i) a candidate training named entity, (ii) a subset of the training text associated with the candidate training named entity, and (iii) a labeling output indicating whether the candidate training named entity is a named entity;
creating a training feature vector, wherein the training feature vector includes one or more features of the training subset of the subset of the training text;
analyzing the training feature vector using the first machine learning model to generate an indication of whether the first machine learning model identified an error associated with the candidate training named entity;
comparing the indication with the labeling output to identify one or more errors in the indication; and
updating one or more parameters of the first machine learning model based on the one or more errors in the indication.

7. The method of claim 6, wherein the first machine learning model is initially configured to identify errors associated with candidate named entities recognized from a first document type and updating one or more parameters of the first machine learning model enables the first machine learning model to identify errors associated with candidate named entities recognized from a second document type.

8. The method of claim 1, wherein the candidate named entity is recognized using a second machine learning model.

9. The method of claim 1, wherein the one or more features include at least one of a named entity label associated with the candidate named entity, a recognition accuracy prediction of the candidate named entity, a distance measure between the first subset of the text and a previous subset of the text, a distance measure between the first subset of the text and a subsequent subset of the text, an embedding vector associated with the first subset of the text, semantics of the first subset of the text, and/or a similarity of the candidate named entity contained within the first subset of the text and a named entity and/or a candidate named entity contained within a second subset of the text.

10. The method of claim 1, wherein removing the candidate named entity improves the accuracy of named entities recognized within the text.

11. The method of claim 1, wherein the steps of the method are performed on a plurality of candidate named entities recognized within the text.

12. The method of claim 1, wherein the recognizing a candidate named entity within the text further comprises recognizing a plurality of candidate named entities from a plurality of texts, and wherein performing the method corrects errors associated with at least a subset of the plurality of candidate named entities from the plurality of texts.

13. A system comprising:
a processor; and
a memory storing instructions which, when executed by the processor, cause the processor to:
recognize a candidate named entity within a text;
extract a first subset of the text that contains the candidate named entity;
analyze, with a classifier, one or more features of the first subset of the text to identify an error associated with the candidate named entity; and
correct the error associated with the candidate named entity.

14. The system of claim 13, wherein the instructions further cause the processor to:
storing a document image in a memory; and
recognizing the text from the document image.

15. The system of claim 13, wherein the error associated with the candidate named entity is that the candidate named entity is not a named entity and correcting the error associated with the candidate named entity includes removing the candidate named entity as a potential named entity in the text.

16. The system of claim 13, wherein the classifier analyzes the one or more features using a first machine learning model.

17. The system of claim 16, wherein the instructions further cause the processor to:
receive a labeled training text comprising (i) a candidate training named entity, (ii) a subset of the training text associated with the candidate training named entity, and (iii) a labeling output indicating whether the candidate training named entity is a named entity;
create a training feature vector, wherein the training feature vector includes one or more features of the training subset of the subset of the training text;
analyze the training feature vector using the first machine learning model to generate an indication of whether the first machine learning model identified an error associated with the candidate training named entity;
compare the indication with the labeling output to identify one or more errors in the indication; and
update one or more parameters of the first machine learning model based on the one or more errors in the indication.

18. The system of claim 17, wherein the first machine learning model is initially configured to identify errors associated with candidate named entities recognized from a first document type and updating one or more parameters of the first machine learning model enables the first machine learning model to identify errors associated with candidate named entities recognized from a second document type.

19. The system of claim 13, wherein the one or more features include at least one of a named entity label associated with the candidate named entity, a recognition accuracy prediction of the candidate named entity, a distance measure between the first subset of the text and a previous subset of the text, a distance measure between the first subset of the text and a subsequent subset of the text, an embedding vector associated with the first subset of the text, semantics of the first subset of the text, and/or a similarity of the candidate named entity contained within the first subset of the text and a named entity and/or a candidate named entity contained within a second subset of the text.

20. A non-transitory, computer readable medium storing instructions which, when executed by one or more processors, cause the one or more processors to:
recognize a candidate named entity within a text;
extract a first subset of the text that contains the candidate named entity;
analyze, with a classifier, one or more features of the first subset of the text to identify an error associated with the candidate named entity; and
correct the error associated with the candidate named entity.

* * * * *